(12) United States Patent
Polt

(10) Patent No.: US 8,610,037 B2
(45) Date of Patent: Dec. 17, 2013

(54) COOKING SCORE THERMOMETER

(76) Inventor: Bogdan Robert Polt, Redmond, WA (US)

( * ) Notice: Subject to any disclaimer, the term of this patent is extended or adjusted under 35 U.S.C. 154(b) by 0 days.

(21) Appl. No.: 13/276,239

(22) Filed: Oct. 18, 2011

(65) Prior Publication Data

US 2012/0100269 A1 Apr. 26, 2012

Related U.S. Application Data

(60) Provisional application No. 61/455,544, filed on Oct. 22, 2010.

(51) Int. Cl.
*H05B 1/02* (2006.01)

(52) U.S. Cl.
USPC ........... 219/494; 219/492; 219/497; 219/506; 99/328

(58) Field of Classification Search
CPC ........................................................ H05B 1/02
USPC .................... 219/492, 494, 497, 501, 506; 99/325–333

See application file for complete search history.

(56) References Cited

U.S. PATENT DOCUMENTS 8,455,027 B2    6/2013 Samples, Jr.

*Primary Examiner* — Mark Paschall
(74) *Attorney, Agent, or Firm* — Frommer Lawrence & Haug LLP; Jamie L. Wiegand

(57) ABSTRACT

A method and apparatus for monitoring and controlling a cooking process, which includes a process for determining doneness using a single parameter as a combination of temperature and time applicable to a class of foods and specifically configured to be a robust measurement of doneness, parameter which will be referred to as "cooking score".

17 Claims, 12 Drawing Sheets

Table I.

| Point | Oven (°F) | Food Size | Doneness |
|---|---|---|---|
| 1 | 200°F | small | 94% |
| 2 | 250°F | small | 95% |
| 3 | 300°F | small | 98% |
| 4 | 350°F | large | 95% |
| 5 | 350°F | large | 110% |

Table II.

| Food | Quantity | Oven Temp |
|---|---|---|
| F1 | small | 300°F |
| F2 | large | 350°F |
| F3 | large | 300°F |
| F4 | large | Variable 370-295°F |

COMPARATIVE EXAMPLE:
METHOD OF US PAT APP. No. 2011/0052767

Table III.

| Food | Quantity | Oven Temp | EI | CS |
|---|---|---|---|---|
| F1 | small | 300°F | 173.6 | 129.5 |
| F2 | large | 350°F | 121.2 | 126.8 |
| F3 | large | 300°F | 120.9 | 128.2 |
| F4 | large | Variable 370-295°F | 108 | 129.2 |
| | | Average | 130.9 | 128.4 |
| | | 2 Std Deviations | 25.2 | 1.05 |

COOKING SCORE THERMOMETER

CROSS REFERENCE TO RELATED APPLICATIONS

This application claims priority to U.S. Prov. Appl. No. 61/455,544, titled Method and Apparatus for Determining Doneness in Foods during Cooking, filed 22 Oct. 2010, said patent document being incorporated in full by reference.

FIELD OF THE INVENTION

This invention is related to a process of cooking, where doneness is calculated from an equation involving temperature and time and a cooking score is displayed or transmitted to a process controller.

BACKGROUND OF THE INVENTION

Cooking is a skilled art, and methods are passed down from generation to generation or by word of mouth. The teachings of conventional wisdom, which commonly relate to oven temperature and cooking time, for example, and are annotated with each recipe, are intended to result in a reproducible quality of the finished product. Sometimes however, despite all care and attention, a dinner may be ruined because the meal was overcooked or undercooked, and the tools or monitoring techniques available to avoid this lack sophistication and reliability.

For example, there are many variables involved in determining the right timing for oven cooking. The oven temperature is important but so is the type of food, quantity, thickness, added ingredients, cooking vessel, and presence of a cover such as a lid or a foil wrap. The expected cooking time for a specific food of a specific size and for a chosen oven temperature is often known only under carefully controlled conditions. Small variations in food size, for example, or other cooking parameters will likely invalidate the results of prior experience, so that the process of finding the right cooking time can involve considerable guesswork.

A common method for checking doneness is to cut into the food and visually check the food color and consistency. However, taking the food out of the oven disrupts the cooking process, and cutting can mar the appearance of the dish or result in uneven cooking.

Another method for checking doneness is to insert a cooking thermometer into the food. For continuous monitoring without opening the oven door, more recent cooking thermometers have a temperature probe attached to a monitor or display through a long, heat resistant wire. The wire is led out of the oven and plugged into the display which is conveniently placed nearby. The temperature and time can then be read continuously while the food is cooking.

Commonly used cooking instructions advise the cook to terminate cooking when the internal temperature reaches a certain value, the value depending on food type and desired degree of doneness. Information can also be accessed on the approximate adjustment time required for cooking to compensate for dimensions or weight.

Simply following these instructions may lead to variations in final degree of doneness. In fact, the doneness of a food depends not only on the final temperature but also on the temperature history during the entire cooking period. At the beginning when the temperature is low the food will cook slowly, and during the final stage of the cooking process, when the internal temperature is high, the cooking rate will be much higher. This relationship has not been appreciated, in part because means for measuring and displaying the temperature history have not been available. Thus, even for experienced cooks, cooking quality and doneness is difficult to reproduce and may vary substantially from day to day or place to place.

US Pat. Appl. No. 2011/0052767 to Samples describes a method and system for determining doneness during a cooking process based on a method for accumulating an integral of a meat's internal temperature minus some threshold temperature, where a doneness index EI is calculated from a second order polynomial equation. However, second order polynomial functions, also called parabolic functions have certain limitations in fitting certain sets of data and it remains unclear whether any single such equation could ever be useful in predicting a cooking outcome where the process conditions were not rigidly controlled. This method can only ensure reproducible cooking quality under practically same conditions or for cooking condition having only small variations from the reference condition. Comparative studies shown here include FIGS. 11-12 and FIGS. 8-9 versus FIG. 16.

Thus there is a need in the art for a more reproducible method and apparatus for assessing temperature history in a cooking process and for predicting the required target doneness that will work to the satisfaction of the user regardless of variations in food or process conditions.

SUMMARY

Disclosed is a method and apparatus for monitoring both temperature and time to determine doneness during the process of cooking of foods. Temperature and cooking time are both included in a temperature history of the process, which can be described in a single parameter, a "cooking score". This method has broad applicability.

Without this information, the results of a cooking process cannot be predicted except by long practice and experience. For example, there is no way to know whether cooking achieved by ramping food to 155° F. in 30 minutes would be equivalent to cooking achieved by ramping food to 170° F. in 15 minutes. Similarly, a thinner food will heat faster than a thick food, and a steak with higher water content will heat more slowly and unpredictably than a marbled steak. Given all these complexities, there is no way to ensure, absent trial and error, that an equivalent cooking quality will be achieved in each case.

The present invention solves this problem by measuring both cooking time and temperature, and using a suitable function calibrated for a particular class of food, displaying in real time a doneness factor termed a "cooking score". Circuitry configured for measuring the cooking score may also be used to control the cooking process.

The cooking score can also be used to accurately predict when a food reaches a certain level of doneness even when cooking conditions vary. In contrast to temperature, whose variation is the opposite of the actual cooking rate, the new parameter is shown to have a slow increment at the beginning of cooking when the temperature is low and a rapid increment when the temperature is high, and thus when integrated over the time of cooking, more accurately reflects the cumulative level of cooking that has been achieved.

These results are correlated with real cooking cases. Surprisingly, it is possible to reduce the need for experience and trial and error in cooking, and by monitoring a cooking score, obtain equivalent cooking results without reliance on a target temperature and time. Similarly, a person whose oven only cooks at 300 degrees can be successful even if the recipe calls for 400 degrees. This invention frees the cook from trying to second guess the perfect cooking time and lets him devote his energy toward other creative aspects of the culinary art.

While the problem of engineering an apparatus for cooking to a desired degree of doneness, where doneness is defined both in terms of the chemical reactions associated with heating and subjectively in terms of taste, would seem to defy a solution, the method and apparatus of the present invention achieves this result.

Briefly, a temperature monitor or monitors are inserted into food to be cooked, and an electronic circuit is used to record temperature during the cooking process. At selected intervals, or continuously, a cooking score is calculated. Surprisingly, it has been shown that using the equations provided herein, the cooking score maintains the same value when the food has reached similar levels of doneness, regardless of the cooking temperature or food size.

The foregoing and other objectives, features, and advantages of the invention will be more readily understood upon consideration of the following detailed description of the invention, taken in conjunction with the accompanying drawings, in which preferred embodiments of the invention are illustrated by way of example. It is to be expressly understood, however, that the drawings are for illustration and description only and are not intended as a definition of the limits of the invention.

BRIEF DESCRIPTION OF THE DRAWINGS

The teachings of the present invention are more readily understood by considering the drawings, in which.

Figure 1:
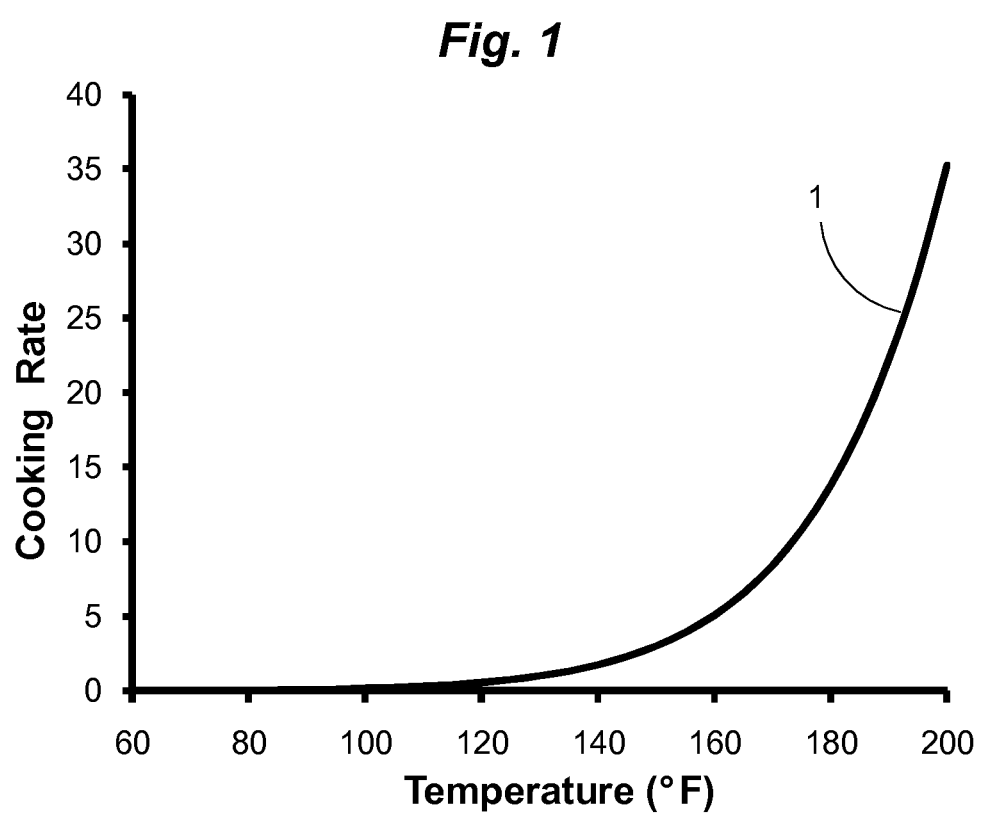
FIG. 1 depicts an Arrhenius Plot showing cooking rate as a function of temperature.

The drawing figures are not necessarily to scale. Certain features or components herein may be shown in somewhat schematic form and some details of conventional elements may not be shown in the interest of clarity and conciseness. The drawing figures are hereby made part of the specification, written description and teachings disclosed herein.

NOTATION AND NOMENCLATURE

"Experimental Doneness" or simply "doneness" represents an estimate by an experienced food taster of the degree a food was cooked to. This is based on taste and appearance of the food. As used here, referring to FIGS. 2A & 2B, doneness can be measured in percent. For steaks, for example, "medium" cooked can correspond to a cooking score of 100%; "rare" to 85%; and "well done" to 115%. The actual doneness degree can be scaled as part of the calibration process and may vary with the choice of the cooking rate formula.

"Cooking rate" ($C_R$) represents the rate at which a food chemically transforms during cooking. Cooking rate is an increasing continuous function of temperature. For implementation or other mathematical purposes the cooking rate can also be an increasing piecewise defined function.

"Cooking Score" (Cs)—refers to the time integral of the cooking rate as a function of temperature history and is a measure of the extent to which the chemical reactions characteristic of the cooking process have proceeded at a certain time.

As it will be seen, Cooking Score and Doneness are closely related.

"Temperature history"—refers to the food temperature exposure over the entire time of monitoring from initiation of heating to either removing the food from the stove or to consumption.

"Solution of a system of equations"—an expression or set of numerical values that determine the unknowns. Some of the different types of solutions are Exact solutions—when the number of unknowns equals the number of equations and the equations of the system are satisfied exactly or to a numerical precision.

Least square solutions—when the number of unknowns is less than the number of equations. In this case the system equations is satisfied approximately.

Trial and error solutions—when a satisfactory solution is sought by trying out different values for the unknowns and select the combination that provides the best results.

A "Sensor probe" may be a thermistor, RTD, or thermocouple adapted for insertion into food during the cooking process. RFID temperature sensors having improved heat resistance may also be used for wireless monitoring.

"Robust"—indicates capable of performing without failure or excessive variation over a wide range of conditions and materials.

DETAILED DESCRIPTION

Although the following detailed description contains many specific details for the purposes of illustration, one of skill in the art will appreciate that many variations and alterations to the following details are within the scope of the invention. Accordingly, the exemplary embodiments of the invention described below are set forth without any loss of generality to, and without imposing limitations upon, the claimed invention.

It has long been sustained that cooking food is ultimately a chain of chemical reactions triggered by temperature. Scientific studies have revealed many complex reactions associated with cooking, each of them very difficult to describe and quantify in isolation, and almost impossible to predict as a whole system. Trying to explain a cooking process based on precise chemistry is impossibly complex.

Instead of trying to split the cooking process in a myriad of complex chemical reactions the present invention will show that useful information can be extracted by modeling an estimated end result termed "cooking score", based on thermal history, where cooking score (Cs) is an index of doneness. Doneness is the result of the combined progress of all the individual reactions during cooking. Doneness is also a subjective estimation of a cook or a person that consumes the food. No solution to the problem of determining doneness which satisfies both scientific rigor and the subjective estimation of the cook has been realized.

In general people are able to characterize a food for different levels of doneness. For example, almost any cooked food can be said to be overcooked or undercooked, and with regard to meat doneness may be characterized as "rare", "medium", or "well done", or even "medium rare". The level of doneness can be judged by whether the meat has a desired pink or brown color, and by whether the meat is moist or dry. But ultimately the taste may involve other more complex sensations that are less easy to judge.

Surprisingly, by monitoring the cooking process as a function of time, using a probe to measure temperature of the food, and by converting temperature history into an integrated cooking score, the guesswork can be taken out of cooking.

The present invention will show that knowledge of the detailed chemistry of cooking is not necessary in order to obtain a good estimate of doneness based on general observations and considering a qualitative definition for doneness. For this, some analytical concepts are introduced. It will be further shown how they can be refined to better capture the cooking results.

A function known to describe the rate of chemical reactions is the Arrhenius equation. The equation is particularity valid for reactions happening in the range of temperatures not far from room temperatures as cooking in general is. One form of this equation used in this analysis is given by $$k = Ae^{-Ea/RT} \quad (1)$$

where k is the chemical reaction rate, T is the temperature measured in °K, R is the gas constant, $E_a$ is an activation energy, and A is in general a pre-exponential factor that can also depend on temperature. For our analysis A is taken as a proportionality constant.

Typical values for the activation energy around room temperature run from 20 to 150 kJ/mol. With gas constant R=8.314 J/mol-° K, normal values for $E_a/R$ are between $0.24 \times 10^4$ and $1.8 \times 10^4$.

The "cooking rate" $C_R(t)$ of a food is defined as the amount of cooking, resulting in doneness, that takes place over a unit of time. Because cooking can be regarded as a multitude of chemical reactions, a relation like the one in Eq. 1 is considered to describe the effect of many simultaneous reactions:

$$C_R(t) = Ae^{-Ea/RT(t)} \quad (2)$$

This method simplifies the problem by regarding cooking as defined by a single composite reaction. An example of a Cooking Rate function is given in FIG. 1 where Ea/R=4,000. A chosen such that the $C_R$ at 130° F. is 1.0.

A cumulative cooking score or, simply, "Cooking Score" ($C_S$), at a certain time $t_1$ is obtained by integrating the cooking rate from the time the heating started, say $t_0$, $$C_S(t_1) = \int_{t_0}^{t_1} C_R(T) dt \quad (3)$$

where the temperature T is a function of time t.

The cooking score will continuously increase with time at a rate that has strong temperature dependence. The higher the temperature, the higher the $C_S$ rate of increase. At low temperatures $C_S$ will increase so slowly that cooking may be almost undetectable, while at higher temperatures the cooking rate becomes increasingly more rapid.

Theoretically, if cooking would only involve a single chemical reaction and the reaction-dependent parameters are tuned to model it, Eq. 3 would provide the same cooking score at doneness no matter what the temperature history is. Real cooking departs from this ideal situation and Eq. 3 needs to model all the competing reactions that take place during cooking and affect doneness. The problem then becomes choosing the values for the tuning parameters of Eq. 2, or any other equation meant to describe the cooking rate, such that the cooking score of Eq. (3) is an objective but subjectively adequate method for predicting doneness.

In order to be useful, the cooking score will need to provide a criterion or signal for when cooking needs to be terminated that can be applied to different classes of foods and which allows for smaller or larger variations in temperature history. Advantageously, for different food quantities under different temperature settings, the cooking score will have the same value at the same degree of doneness. Cooking score is to be used as a tool to assess (and predict) doneness.

Figures 2A, 2B:
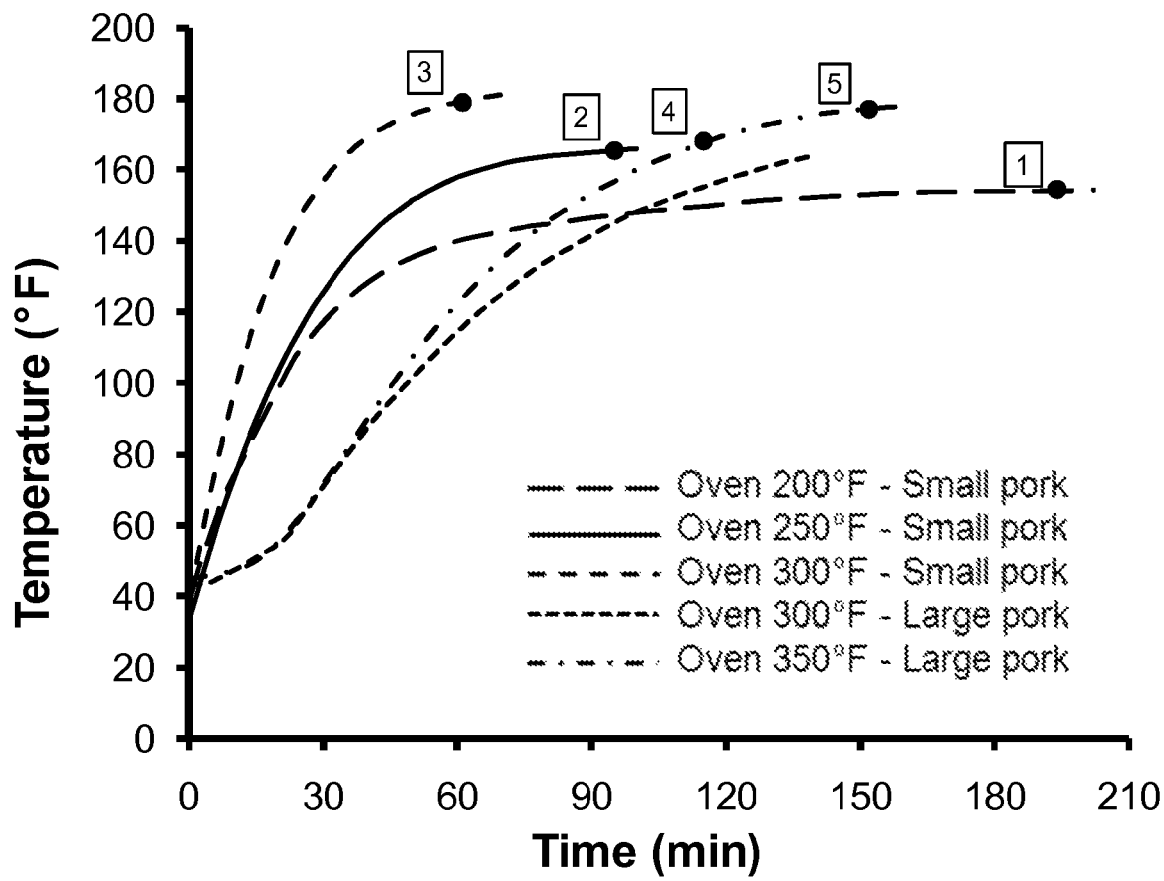
FIG. 2A is a plot showing heating curves with doneness points as described in the table of FIG. 2B.
FIG. 2B is a table of doneness points (Table I).

In order to find the relation between the qualitative measure of doneness D and the quantitative measure of cooking score $C_S$ we look at FIG. 2A. Here, a number of temperature histories obtained for the same food type (in this case, pork tenderloin) under different conditions are presented. Two food quantities were used: Small—0.6 lbs, and Large—1.2 lbs. Oven temperature was set to a range of values between 200° F. and 350° F. As shown, temperature in the meat, as measured with an embedded probe, increases and generally tends to plateau when the food approaches doneness. At selected points I=1, 2, 3, 4 and 5, called determination points, the meat was sampled to assess doneness. Table I in FIG. 2B lists the degree of doneness associated with each point tested. The doneness was obtained by visual inspecting and tasting the food.

At each determination point where doneness is estimated, a cooking score ($C_S$) can be calculated using Equation 3. Since the cooking score, just like the doneness, is defined to represent the measure of the degree to which a food has cooked, one can write at each determination point I $$C^I_S(t_I) = B * D_I \quad (4)$$

where $C^I_S(t)$ is the cooking score calculated at time $t_I$ corresponding to point I and $D_I$ is the experimentally determined doneness at point I, as exemplified in Table I. B is a proportionality constant that relates the experimental doneness units to cooking score units. Point I for a food and cooking process is defined by the time of determination and the associated temperature history. The number of determination points can vary from one, corresponding to the simplest, least useful calibration, to multiple points covering a spectrum of different oven settings, quantities, as well as different degrees of doneness. Different food types may require different calibrations.

Figure 3:
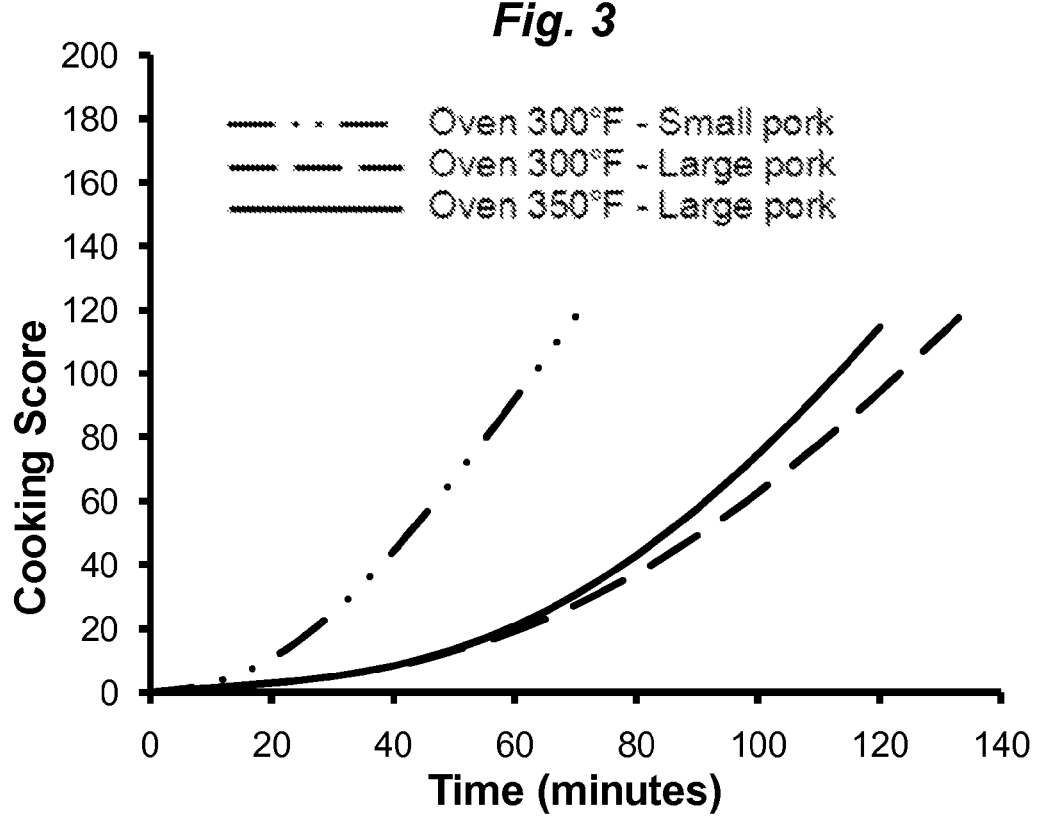
FIG. 3 is a plot showing experimental cooking score variations for cooking pork.

FIG. 3 shows the cooking score variation for three histories of cooking pork. A convenient solution for Eq. (4) was found by trying different values for $E_a/R$. The best match was obtained for $E_a/R=4000$. Each curve is terminated at doneness. The y-intercept at doneness is tightly clustered at about $C_S=120$. It can be seen that results match very well for the oven settings of 300° F. and 350° F. for both food quantity. For example, the same cooking score was obtained for cooking 0.6 lbs of pork at 300° F. which took 70 minutes, or for cooking 1.2 lbs of pork at 350° F. which took 120 minutes, or for cooking 1.2 lbs of pork at 300° F. which took 134 minutes.

Figure 4:
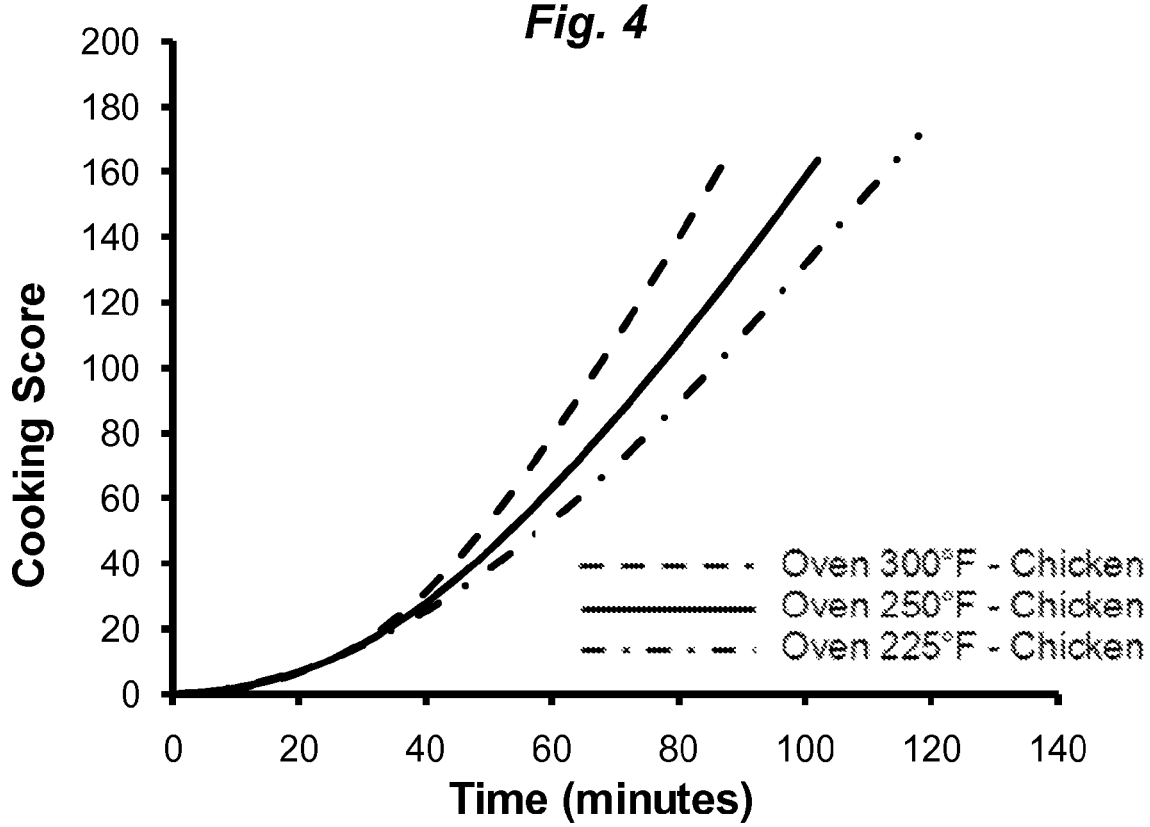
FIG. 4 is a plot showing experimental cooking score variations for cooking chicken.
Figure 5:
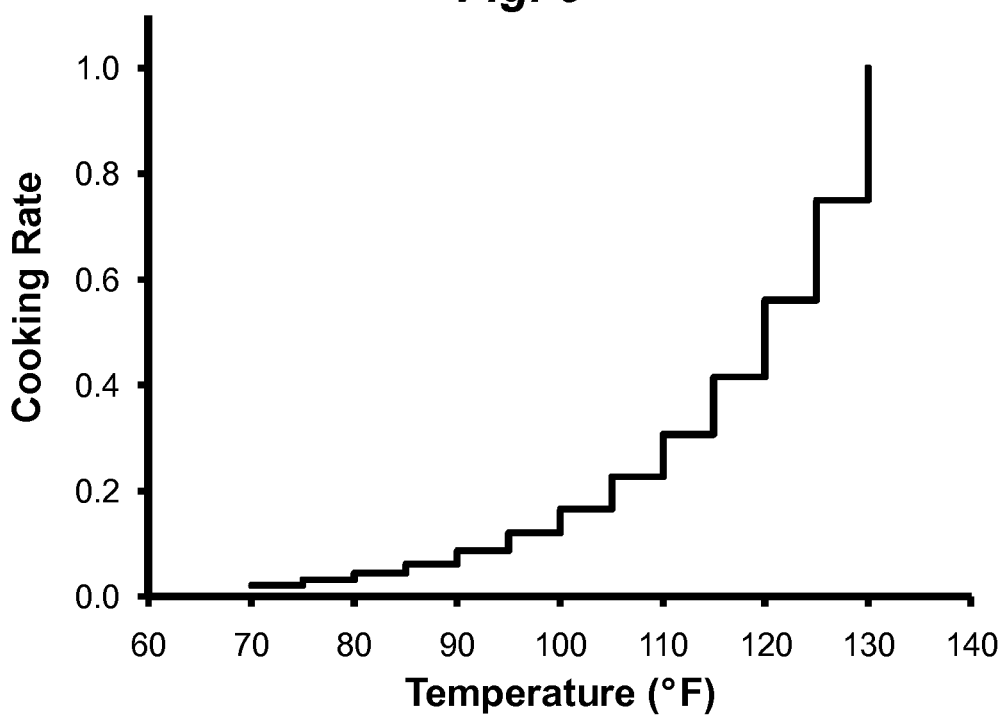
FIG. 5 plots a cooking rate ($C_R$) as a piecewise constant (i.e., a step function).

FIG. 4 shows a similar determination, but for cooking chicken breasts at oven temperatures between 225° F. and 300° F. The cooking rate with the best match to doneness was found to be the same ($E_a/R=4000$) as for the food in FIG. 3, however, the cooking score was higher, about 160.

Other functions or combination of functions that provide additional tuning and calibration parameters may give a better match. For example, a modified form of Eq. 2 that may be useful makes explicit the temperature dependence of the pre-exponential factor:

$$C_R(T) = A(T/T_0)^n e^{-Ea/RT} \quad (5)$$

where $T_0$ is a reference temperature and n is a unitless power with usual values between −1 and 1. Here, n is the additional parameter that can be adjusted for a better tuning.

In a formulation that accounts for multiple reactions, the sum of cooking rate functions can be considered $$C_R(T) = A_1 \sum_{k=1}^{k=n} \frac{A_k}{A_1} e^{-Ea_k/RT_i} \quad (6)$$

where 'n' is the number of chemical reaction taken into account. For n=1 the equation reverts to Eq. (3). $A_1$ is a proportionality constant that can be used to scale the result to a convenient value. The weighting parameters $A_k$ can also be a function of time. The number of tuning parameters can be increased to provide more flexibility for matching more doneness conditions.

In another formulation, the cooking rate can be cast as the sum of linear independent shape functions $$C_R(T) = w_0 \sum_{i=1}^{n} w_i f_i(T) \quad (7)$$

The system of Eq. (4) can then be solved for the coefficients $w_i$.

Eq. (7) can also be viewed as a the sum of unit rectangular functions $f_i(T)$ defined on selected temperature intervals.

One recognizes that in all these expressions the temperature T is a function of time.

Another form for the cooking rate can be given by a Taylor series expansion $$C_R(T) = C_R(T_0) + \frac{C'_R(T_0)}{1!}(T-T_0) + \frac{C''_R(T_0)}{2!}(T-T_0)^2 + \ldots \text{HOT} \quad (8)$$

where HOT stands for "Higher Order Terms". Just a few lower order terms can then be used.

Figure 6:
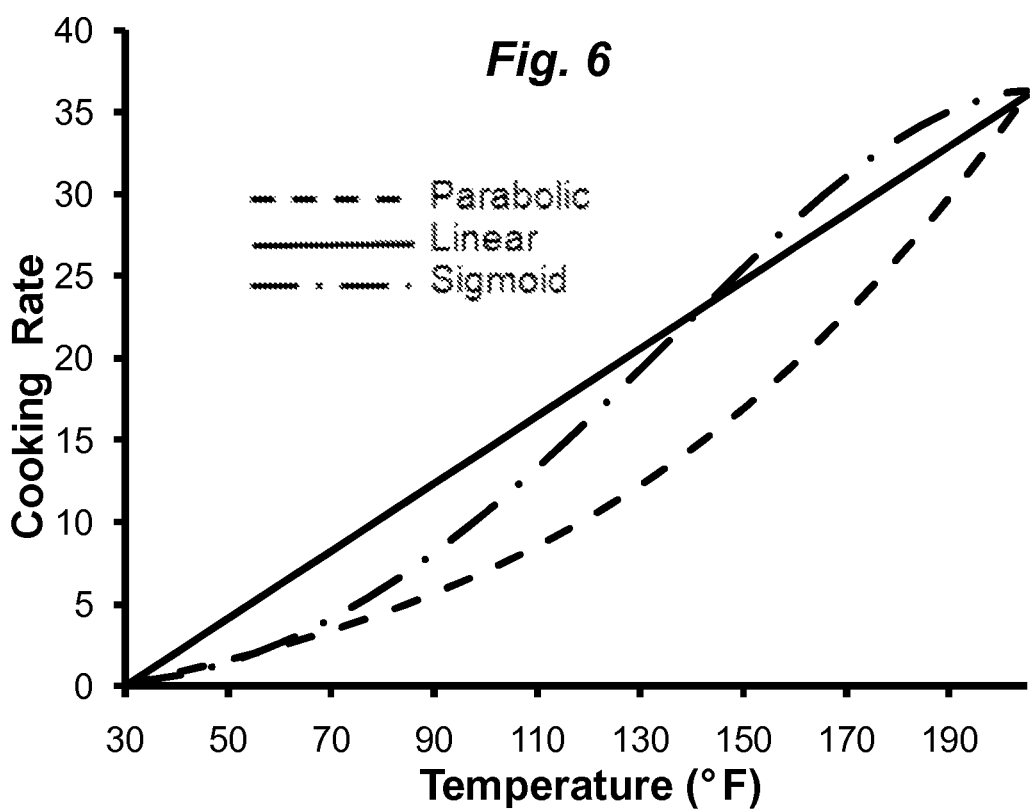
FIG. 6 plots intuitive cooking rate curves.

Another practical solution is to consider a series expansion over small temperature intervals. This can produce, for example, a piecewise constant function as shown in FIG. 6. Here, the unknowns are the values for each temperature interval division. Step functions of this type are readily stored in non-volatile memory of a computer and are computationally inexpensive to implement.

Solving a system of equation like the one given by Eq. (4) for a large number of tuning parameters can be challenging. If the number of unknowns matches the number of equations, an exact solution can be solved analytically or numerically. If the number of equations exceeds the number of unknowns, a Least Squares approach can be used. The problem can also be formulated as an optimization problem requiring the minimization of a certain Objective function which can be constructed based on the difference between a certain target score and the cook score predictions. An optimization algorithm can then be used to determine a "best" cooking rate which would minimize the objective function (see, for example, Fletcher, Practical Methods of Optimization (John Wiley, 2$^{nd}$ Ed, May 2000). The numerical values of the cooking rate at different temperatures could be the design variables in this approach. Others may think to use a finite element type approach where the temperature interval is split in small intervals each assuming a certain cooking rate variation. The values at the ends of the intervals are the unknowns. When the number of parameters is small enough, a trial and error method can also be used.

Intuitive Cooking Score

Based on the observation that the cooking rate is slow at low temperatures and faster at higher temperature, linear, parabolic or sigmoid curve fits as presented in FIG. 6, for example, would intuitively be expected to give good predictions of doneness as a function of temperature history. However, this is not entirely so. Selection of an inappropriate analytical model and not calibrating it is shown to result in less effective predictions of the index of doneness.

As can be seen, the parabolic curve is shallow, presumably overestimating cooking rate at lower temperatures and not catching up at higher temperatures. The sigmoid curve exacerbates the overestimation of cooking rate at medium temperature range, and plateaus at higher temperatures, an unlikely event. The linear curve again overestimates the cooking effect at lower temperatures and underestimates it at high temperature, producing in fact a constant cooking rate at all temperatures which is an oversimplification. While it is possible to compensate in part by simply throwing out data collected below a critical threshold, the question of a critical threshold poses a whole new range of uncertainty and does not satisfactorily provide a computational model that accurately models (and can assess and predict) cooking doneness over a range of temperature histories and times. In case of small variations from a reference configuration, intuitive functions might be used for assessing doneness, but in real world situations, where variability from one meal to the next is likely to be much greater, the devices of this sort are unsatisfactory and do not solve the problem of generating a reliable cooking score.

Robust Cooking Score

A score based on an arbitrary choice of a cooking rate function does not guaranty repeatability except when applied to the same cooking condition. Something has to show that the cooking rate that is used is in fact a robust measurement of doneness and is operative over a range of experimental variability, including variability in temperature and portion size. Otherwise, if the cooking condition varies, the cooking score will not be consistent and therefore misleading, reducing the user back to a state of guesswork.

A method is presented here to devise a cooking rate function that truly represents doneness over a wide range of test conditions and not a mere pseudofit of a limited dataset. For this, a selection of experiments were studied where a doneness coefficient was determined for a series of points belonging to temperature history curves obtained experimentally. The cooking conditions cover a certain class of foods and are described by the same cooking score.

Figures 7A, 7B:
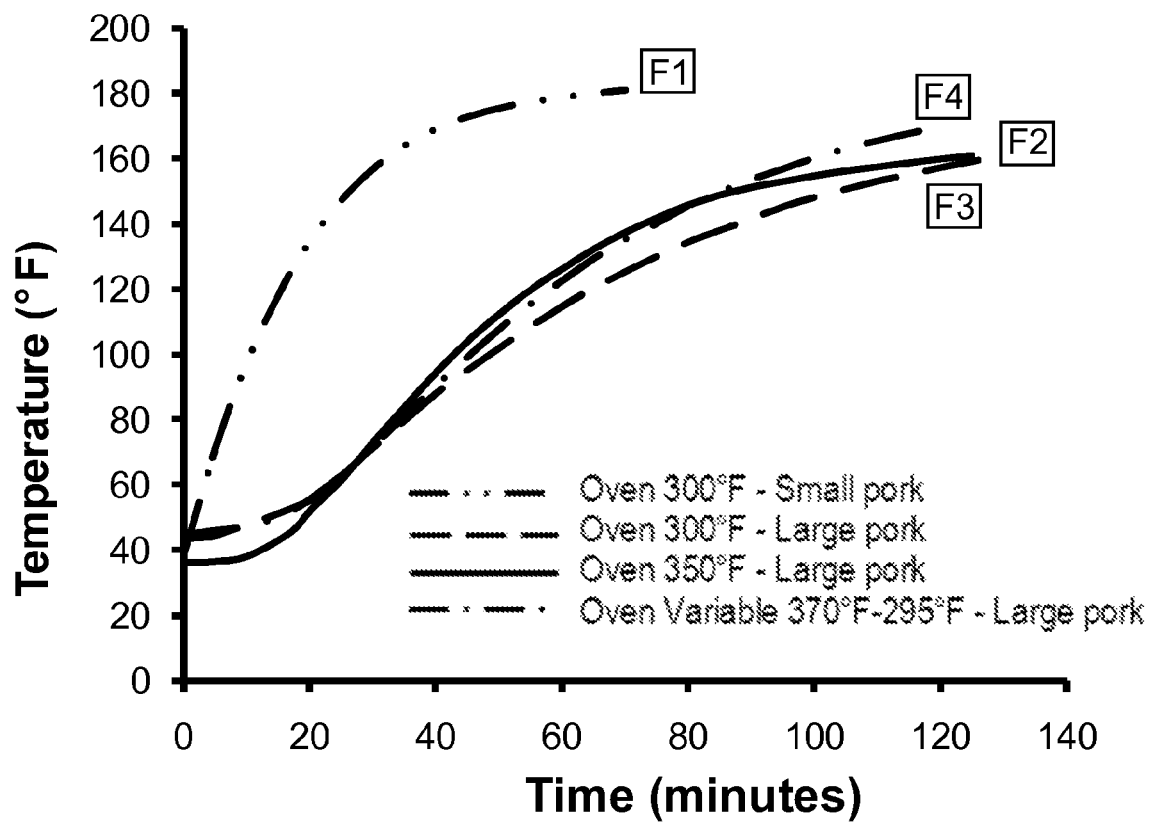
FIG. 7A is a plot showing heating curves under varying conditions.
FIG. 7B describes the conditions for each food sample that is plotted (Table II).

By way of demonstration, while not limiting thereto, the results for cooking score will be examined considering four heating curves presented in FIG. 7 for different quantities of pork under different oven conditions. At the end of the heating curves marked by F1 thru F4 all foods have the same amount of doneness and hence should have the same cooking score. The objective is to find a cooking rate function that best matches the observed levels of doneness.

The Cooking Rate expression given by Eq. (6) is considered. Depending on how many terms are retained, the goal is to find the parameters that best match selected conditions.

Figure 8:
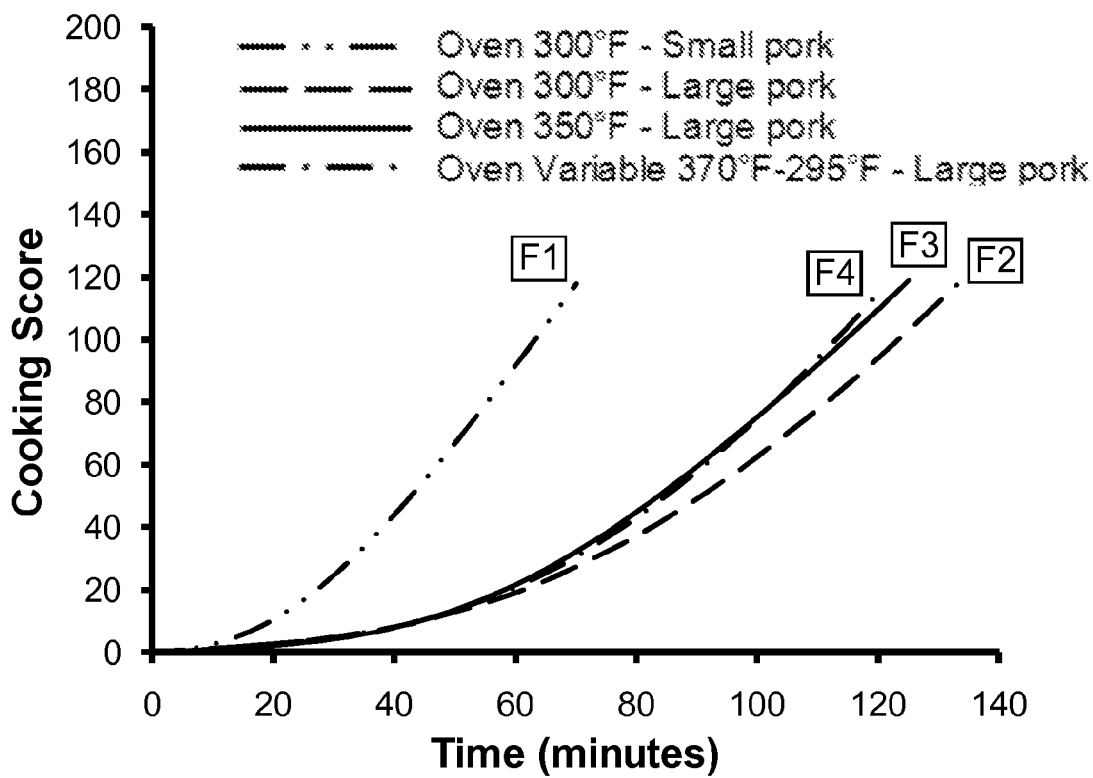
FIG. 8 shows cooking rate curves for a one-term rate function.

For a one-term function given by $$C_R(t) = A e^{-Ea/RT(t)} \quad (9)$$

the best match for the conditions was found to be Ea=4000 and A=4.979×10$^{-6}$. The results are presented in FIG. 8. Cooking scores $C_S$ for F1 and F2 are 117, for F3 is 119, and for the variable oven temperature condition F4 is 114.6. The difference between the max and min values is 3.8%, indicating tight agreement.

For a two-term function given by $$C_R(t) = A_1 e^{-Ea_1/RT(t)} + A_2 e^{-Ea_2/RT(t)} \quad (10)$$

the best match was found for parameters $Ea_1$=1400, $A_1$=1.39×10$^{-6}$ and $Ea_2$=10500, $A_2$=1.202×10$^{-14}$. The results are presented in FIG. 9. Cooking scores cluster closely around $C_S$=129 with the difference between max and min of 2.2%. It can be seen that it was possible to match all scores very closely, both for large and small variation.

Figure 10:
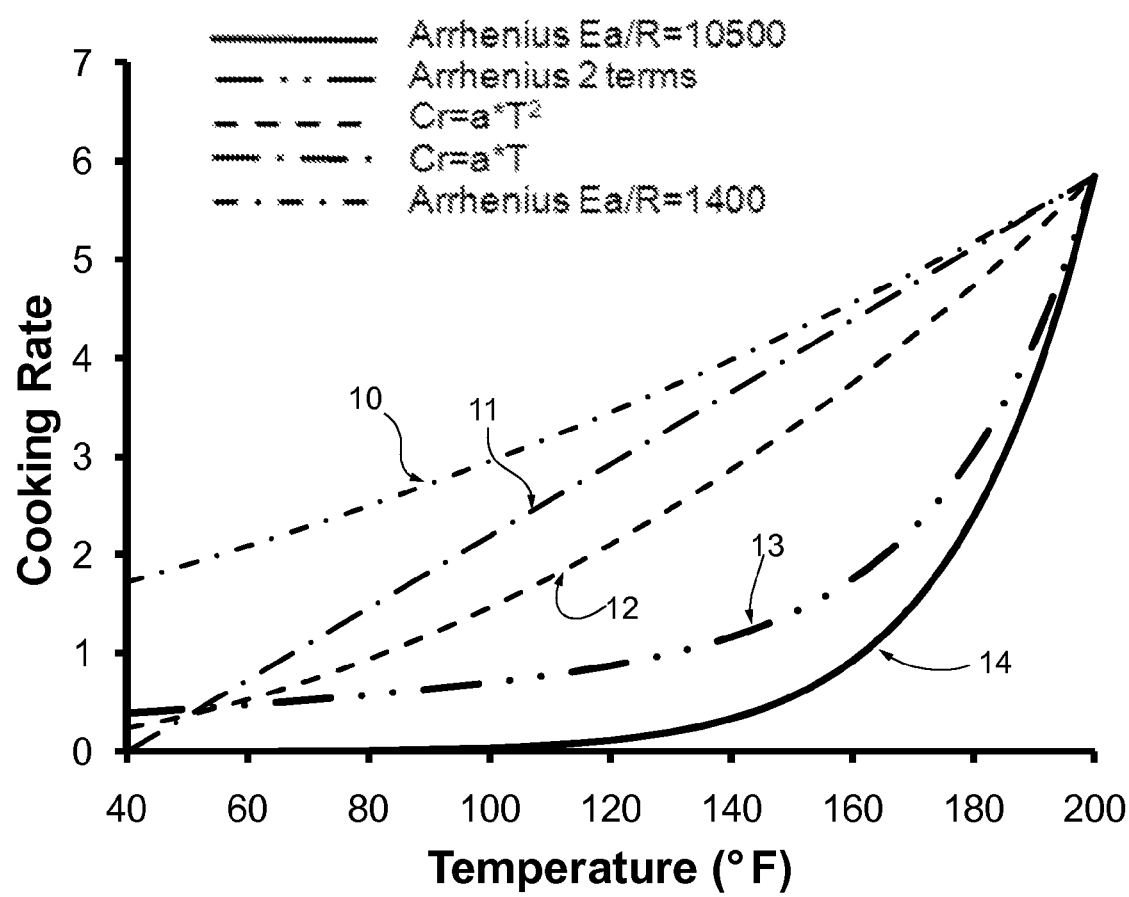
FIG. 10 is a plot comparing parabolic cooking rate variations to Arrhenius variations.

FIG. 10 shows different functions that were used for the cooking rate in the present exercises. (Cr=a*T) and (Cr=a*T$^2$) represent the linear (11) and parabolic (12) variations for the intuitive cooking score. It can be seen their variation is very limited compared with the rich potential of the Arrhenius function to vary its slope. (Arrhenius Ea/R=10500, 14) shows remarkable changes in the cooking rate, far greater than (12), while (Arrhenius Ea/R=1400, 10) is a very shallow curve. The 2-term Arrhenius variation is given by curve (13). The fact that the cooking rate has matched different cooking conditions covering a range of foods demonstrates that a cooking monitor for real world cooking conditions has been realized. Logically, if condition B is somewhere in between conditions A, C, and D, and the cooking score gives good results for conditions A, C, and D, there is a high probability that the cooking score will give good results for condition B as well. The device and method of the present invention demonstrates a required degree of robustness not demonstrated by methods of the prior art.

In another example, the practical benefits of using the Cooking Score index are shown. Two closely similar cooking situations are considered in FIG. 11, which shows the raw data, temperature versus time, without analysis. Here, the slower cooking curve (21, dashed line) is slightly lower, which can be caused by a slightly bigger food quantity or by a lower temperature setting than the faster cooking curve (20). For curve 20, the food achieves doneness after 120 minutes. If a traditional method of cooking until the internal meat temperature reaches a critical temperature is used, the second food would need to cook an additional 18 minutes.

Figure 12:
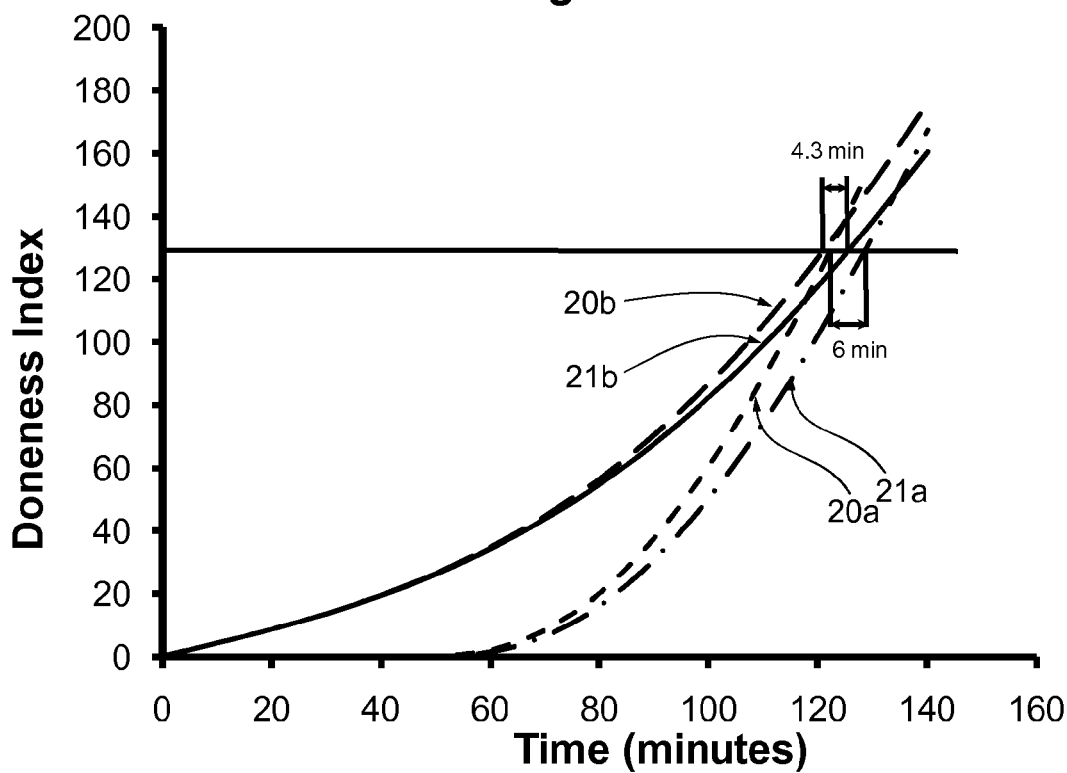
FIG. 12 is a plot comparing intuitive versus robust cooking rate predictions for small variations of cooking conditions.

Instead, these cooking conditions can be analyzed as described above, comparing the robust calculation approach of the invention versus the parabolic curve fit approach, by way of illustration. Comparative doneness indices are plotted in FIG. 12.

Computing the cooking score using the cooking rate given by Eq. (10), the additional time necessary for the slower cooling process to catch up to the faster cooking process is 4.3 minutes (difference between curves 20b and 21b). This is a significant change relative to the traditional temperature-only process control method, which predicted an extra 18 minutes. According to this result, the traditional approach would have resulted in overcooking the food.

Figure 11:
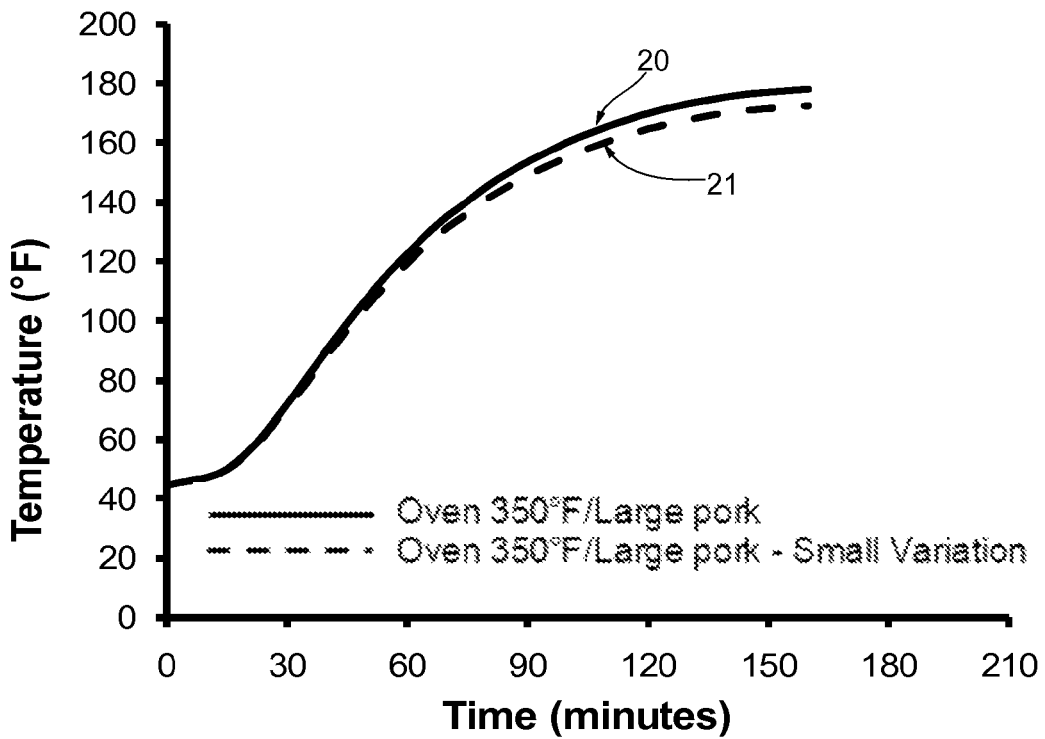
FIG. 11 depicts heating of pork with small variations in cooking conditions.

Using the intuitive parabolic cooking score approach, the slower cooking process is predicting an additional 6 minutes cooking time (difference between curves 20a and 21a) to achieve the same level of doneness as the faster cooking process (20) of FIG. 11.

In short, under conditions of very small variations in cooking conditions, the method of the invention experiences a perturbation in the outcome of the doneness prediction that is about 30% smaller than the perturbation of a comparable method using a polynomial equation, even under very close circumstances. This does not include the ambiguity introduced by selecting a threshold temperature at which to begin the integration. The method of the invention requires no subtraction because of the equations used do not recognize a threshold temperature, instead allowing that some of the changes associated with cooking, such as denaturation of proteins, are occurring at all times, even at room or refrigerating temperatures. In general, low or very low rates are expected at these temperatures.

Thus the method of the invention reduces the cooking time and avoids a possible overcooking of the meat regardless of small variances in the cooking parameters. By providing a user with a device of the invention and an instruction to cook the food until $C_S$ equals 130, for example, a satisfactory pork roast is obtained. If a more "well done" steak was desired, a higher $C_S$ would be specified. Additional calibration for different doneness levels would be required. A table of $C_S$ values for different foods may be supplied in a look-up table in the device, or in accompanying instructions, and a means for selecting a food type and a doneness degree can be provided in the controls of the device.

This approach is found to apply to various classes of foods. Examples are chicken and turkey, whole chicken or turkey, ham, standing rib roast. Bakery products like cakes, breads, and pies can also benefit from using the cooking score calculated as described here.

The relative numerical complexity of calculating an exponential function is not an impediment. Instead of calculating an expression like Eq. (10) each time cooking score is updated, the constant values of the function can be stored in memory in a table form to resemble a step function as depicted in FIG. 6. The cooking rate value can then be retrieved from the table as a function of temperature at each prescribed evaluation time. This would avoid computation time as well as power consumption associated with complex computation.

The cooking score of the invention is used for detection and prediction of doneness and is superior to temperature or time monitored separately. Since its rate increases at higher temperatures, it also improves endpoint detection, because the $C_S$ differential increases sharply at higher temperatures in contrast to temperature which increases slowly.

The method requires a temperature probe to be inserted in a critical area of the food like, for example, the mid section of a piece of meat, and for temperature to be continuously monitored. Based on a monitoring algorithm similar to the one described here, the cooking score is calculated in real time by a calculator device connected to the temperature probe and then is shown on a display. When the cooking score reaches a certain value the food is done and can be removed from the oven or skillet for serving.

Figure 13:
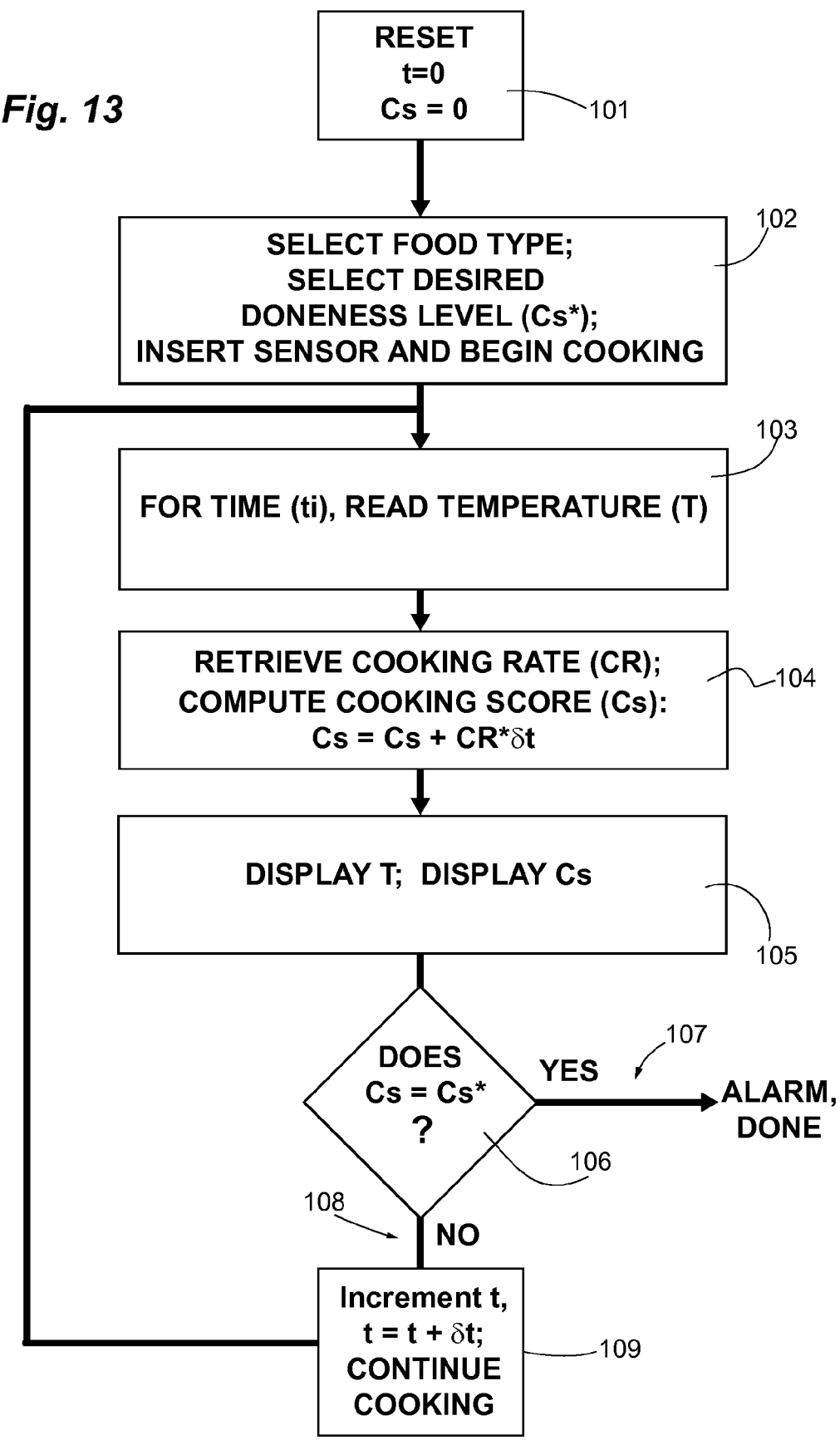
FIG. 13 is a block diagram showing a method of monitoring a cooking process according to the invention.

FIG. 13 is a block diagram showing a method of monitoring a cooking process according to the invention.

Figure 15:
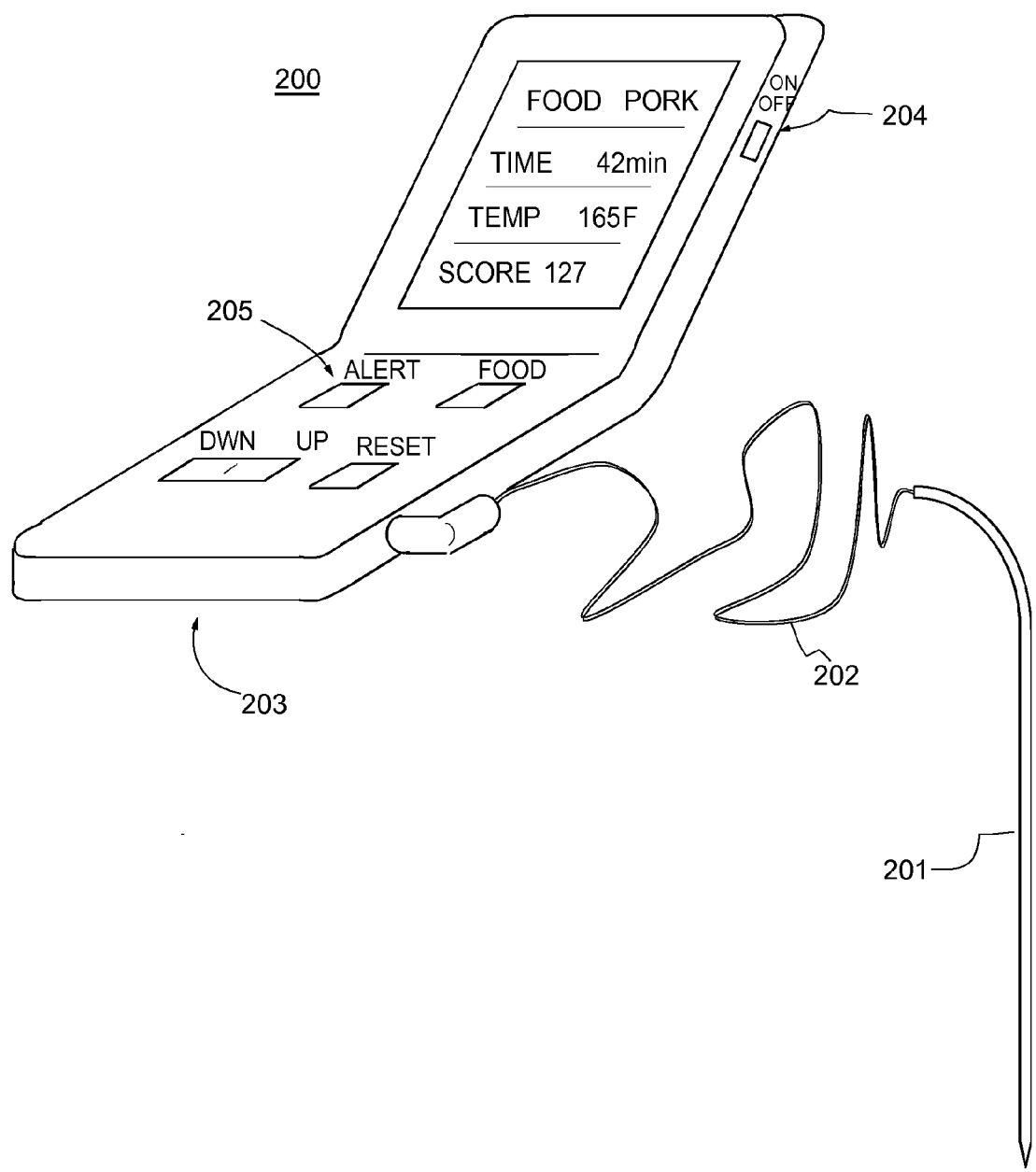
FIG. 15 is a view of a first embodiment of the invention, a hand-held cooking monitor with Cs display and selectable calibration features.

In a first step 101, internal buffers of the apparatus are cleared and the time and cooking score ($C_S$) are set to zero. The user is then asked in step 102 to enter the food type and the desired doneness level (such as rare versus well done). In the following steps, when the desired doneness level (herein termed cooking score with an asterisk, $C_S^*$) is reached, a signal will be generated, an alarm will sound if desired, and optionally, the heating process will be stopped or moderated. Generally the user selections are made with a touch panel as shown in FIG. 15, where a representative device of the invention is depicted. A sensor probe is operatively engaged to monitor food temperature and the cooking process is then initiated.

At 103, temperature monitoring is incremented for time $t_i$. Temperature T is logged and a first cooking score is determined as described at step 104. Calculation of a cooking score involves retrieving a cooking rate expression ($C_R$) from memory (based on user selections) and calculating $C_S$. $C_R$ is a function previously determined under laboratory conditions as described above with possible inputs from daily experience so that objective cooking score $C_S$ is in close agreement with subjective assessments of doneness.

At 105, current cooking score $C_S$, and optionally temperature and time are displayed. In this way, the user can monitor the process, and may know what the target $C_S$ will be for the cooking process. Cooking score will rise with each pass through algorithm, even if heating is shut off or reduced.

In step 106, when $C_S=C_S^*$, then the apparatus will predict that the food is cooked to the desired doneness. A decision point is reached and under control of the microprocessor, a number of actions can be triggered (107). An alarm may sound or be displayed, or a command to a slaved heating unit can be issued, for example turning off the heat and/or starting an exhaust fan. If $C_S<C_S^*$, then heating is continued (108). In step 109, the microprocessor will increment the time and cycle back to step 103 in a continuous loop. The method of FIG. 13 is generally controlled automatically by a controller built into the apparatus. The controller may include for example a microprocessor with memory and embedded programming as shown in FIG. 14.

Figure 14:
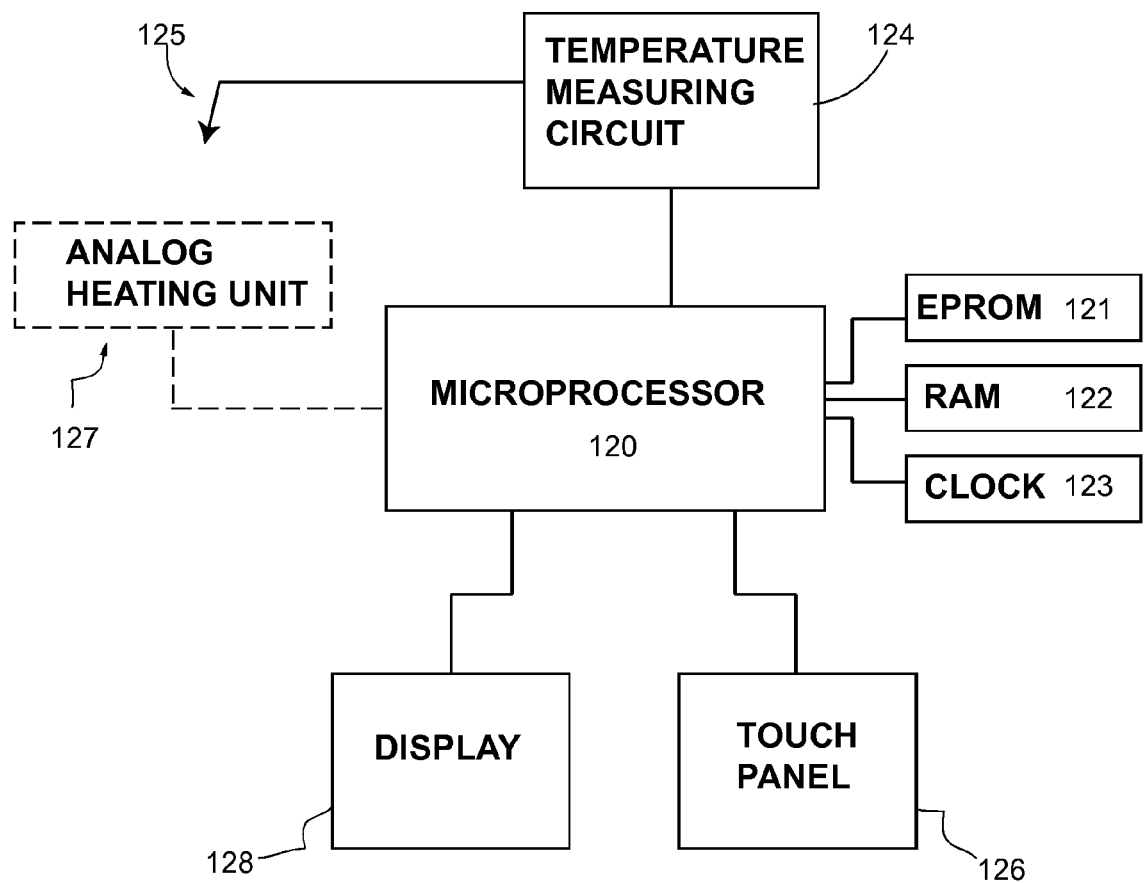
FIG. 14 is a schematic diagram of an apparatus with circuit blocks used in monitoring a cooking process according to the invention.

FIG. 14 is a schematic diagram of an apparatus with circuit blocks used in monitoring a cooking process according to the invention.

The apparatus is generally built around a microprocessor 120, with memory for recording an instruction set (shown here as EEPROM, 121) and dynamic memory for storing data (shown here as RAM, 122), and with a clock function 123. The processing hardware and related software is generally referred to as a controller.

The microprocessor is configured to receive temperature data from an A/D circuit 124 with associated temperature sensor probe such as an RTD, thermocouple, or thermistor 125, which is generally adapted for contacting the food, although non-contacting thermal sensors, including infrared thermometers, may be adapted to work with the apparatus.

Also provided is a touch panel module 126 or other user input interface whereby simple commands, such as selecting a kind of food, a preferred doneness, can be entered. Optionally, other control functions may be entered on this interface or on another interface. Those optional commands are such as may be needed to operate an analog heating unit 127 responsible for the cooking process heat, such as an oven temperature or an inductive power intensity.

Also provided is a display module 128 for relaying information from the controller to the user in visual or audio form according to instructions resident in the apparatus' programming.

A first embodiment 200 of a cooking score monitoring unit is presented in FIG. 15. The apparatus consist of a temperature probe (201), a heat resistant wire (202), and the main unit for setting up the cooking parameters, reading the temperature, performing the calculation, and displaying the results (203). The unit may include an ON/OFF switch 204 and an alert button 205 for signaling completion of the cooking process.

The 'RESET' button initializes the Cooking Score to zero at the start of a new cooking process. The 'DOWN/UP' button is useful in setting up a cooking score that will trigger an alarm to indicate when the food is cooked. The alarm function can be turned on or off with the 'ALERT' button. The 'FOOD' button is used to select between different cooking rates or target scores based on the particular type of food that is cooked. A 'DONENESS' button may also be provided for selecting the doneness level.

Certain of these functions may also be provided with analog circuitry.

Different functionalities are also envisioned. In one embodiment the user needs to initially choose a certain type of food. The user can, for example, choose pork or poultry, since either the cooking rate function or the final cooking score, or both can differ. The 'FOOD' button is used to scroll through different types of food. In another embodiment a more comprehensive rate variation may be used which provides consistent result for a larger variety of foods. Or it can be a more limited cooking score which will only be valid for small variations.

The cooking score monitoring can also be included in ranges or other cooking appliances equipped with continuous monitoring temperature probes.

FIG. 16 describes a comparative example.

As earlier discussed, certain mathematical functions would intuitively seem to be useful for assessing cooking history. The function considered in US Pat. Appl. No. 2011/0052767 to Samples is a parabolic function written as $$C_R(T)=a(T-T_0)^2+b(T-T_0)+c \qquad (11)$$

where $T_0$ is a reference threshold temperature, and coefficients a, b, and c are constants. As disclosed, the Samples application teaches that coefficients can take constant values "to standardize the results" but there is no explanation whatsoever what the 'standardization' means or any indication on how it should be done, such that the reader is compelled to complete the process of experimentation without a clearly marked pathway to success, an effort likely to require an excessive level of experimentation.

According to this method, by using the polynomial equation described in claim 4 (see also paragraph 0013 of the reference), and choosing the starting cooking temperature for beef as $T_0=100°$ F., thereby discarding any data collected at lower temperature, a doneness index termed an "Energy-Impulse value" may be obtained that corresponds to the point in the process at which completion of cooking of meat to a desired doneness level is achieved.

Figure 9:
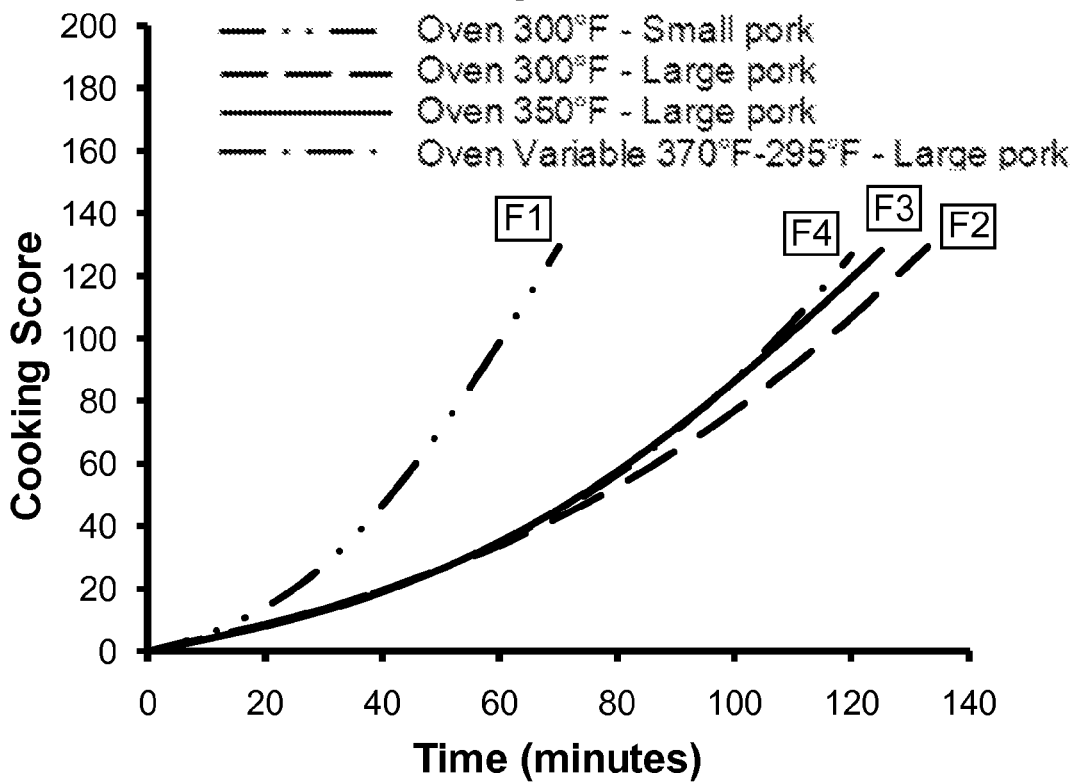
FIG. 9 shows cooking rate curves for a two-term rate function.
Figures 16A, 16B:
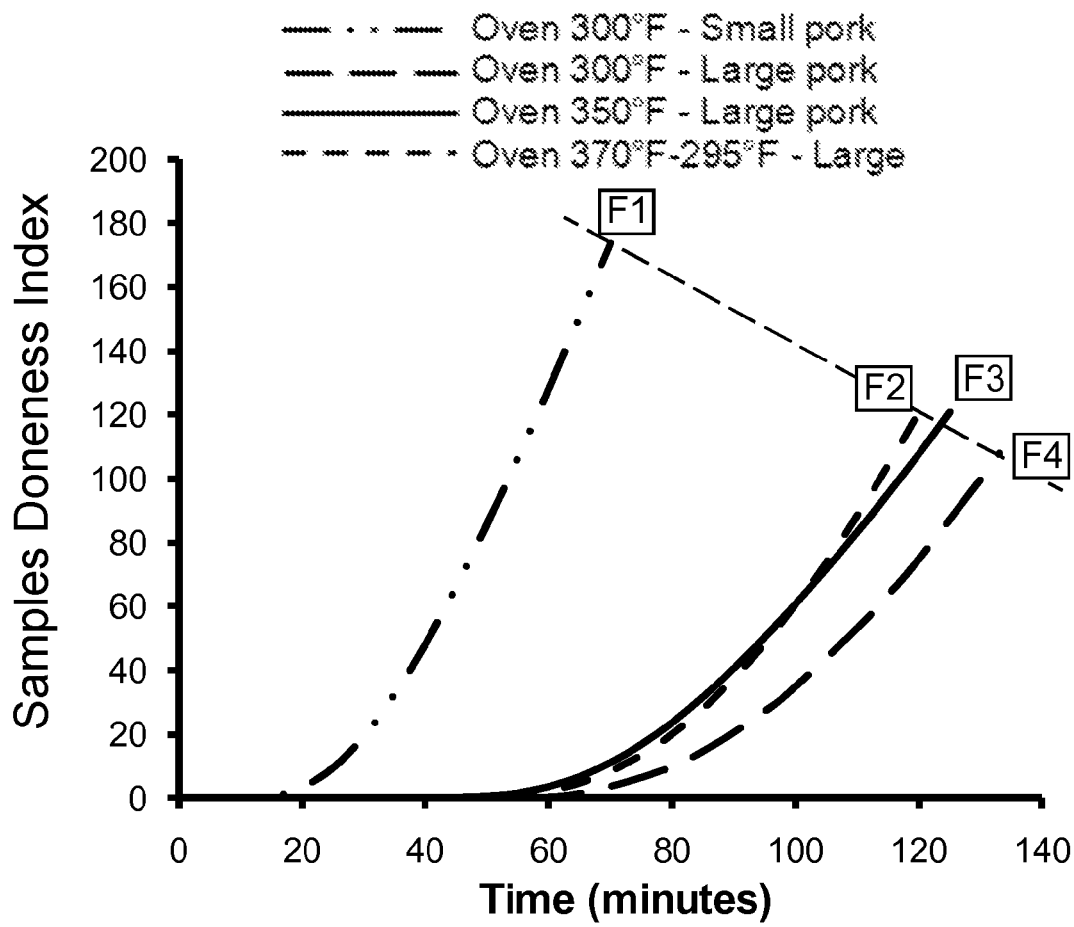
FIG. 16 is comparative study, plotting cooking score using a parabolic cooking rate equation of the prior art. Table III shows a statistical analysis of comparative results using method of the invention and comparative method of US Pat. Appl. No. 2011/0052767 to Samples (Ref 1).

Using Samples' default values (a=1, b=1, c=0, $T_0=100°$ F.) and a proportionality constant of $7.0\times10^{-4}$ to allow for direct comparison with current results, a doneness index for the four temperature histories of FIG. 7 is calculated and the results are presented in FIG. 16A. If F3 (solid line, 350° F.—large pork) is selected as the reference condition, it can be seen that the doneness index (Energy-Impulse) for F1 is 44% larger while for F4 it is 11% smaller. The index is close for F2 and F3 which correspond to very close conditions. Results of the calculation are tabulated in FIG. 16B (column labeled 'EI') and compared against the cooking score ($C_S$) results of the present invention that uses a two-term Arrhenius function as shown in FIG. 9 (column labeled CS).

To compare the results, a standard deviation analysis was used. Samples' method gives a 2σ of 25.2 (or 19.25% of the average value), whereas for the method of the present invention, 2σ is 1.05 (or 0.82% of the average value), a surprising improvement in precision and control of doneness and an advance in the art.

Surprisingly, the prior art method yields a result that is highly dependent on cooking conditions (sloped dotted line), whereas the method of FIGS. 3, 4, 8 and 9 yields an essentially flat cooking score over the same range of cooking conditions. Differences in cooking score between types of food are noted, but are readily accounted for. Further, it is shown that the method of the present invention eliminates the need for a threshold temperature correction, a qualitative difference and an advance in the art. Thus in preferred embodiments, the $C_R(T)$ of an apparatus of the invention is not a polynomial of the form $$C_R(T) = a(T-T_0)^2 + b(T-T_0) + c$$

The results of FIG. 16 show that it is difficult to match a variety of conditions using an intuitive approach, and, while a parabolic variation might give a good prediction when the cooking conditions were relatively close, it is unlikely to be helpful when cooking conditions vary from day to day, place to place, or meal to meal.

Thus the cooking score thermometer of the present invention solves a more meaningful problem and is surprisingly effective in overcoming cooking variations such as would be routinely encountered, variations in portion size, in cooking temperature, in the accuracy of ovens, in interruptions in cooking such as by opening the door, in thawed versus unthawed portions, and so forth, and as such is an advance in the art.

The above disclosure is sufficient to enable one of ordinary skill in the art to practice the invention, and provides the best mode of practicing the invention presently contemplated by the inventor. While there is, provided herein, a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative functions that satisfy the given criteria, methods of solution of systems of equations whether analytical or numerical, food classes definitions, sizes, shapes, forms, functions, operational features or the like. Therefore, the above description and illustrations should not be construed as limiting the scope of the invention, which is defined by the appended claims.

Certain terms throughout the following description are used to refer to particular features, steps or components, and are used as terms of description and not of limitation. As one skilled in the art will appreciate, different persons may refer to the same feature, step or component by different names. Components, steps or features that differ in name but not in function or action are considered equivalent and not distinguishable, and may be substituted herein without departure from the invention.

The various features of novelty that characterize the invention are pointed out with particularity in the claims annexed to and forming part of this disclosure. The invention does not necessarily reside in any one of these features taken alone, but rather in the particular combination of all of its structures for the functions specified.

The invention claimed is:

1. A cooking apparatus for determining a measure of doneness of a food item, comprising:
   a memory device that is arranged to store a predetermined calibrated cooking rate function, $C_R(T)$, for a food type, wherein T is a temperature and $C_R(T)$ includes at least one exponential term having an exponent as a function of T; and
   a processor device that is arranged to iteratively execute instructions that enable actions, including:
      monitoring an internal temperature of the food item of the food type;
      determining a cooking rate value for the food item based on the monitored internal temperature of the food item and using the stored $C_R(T)$;
      determining a cooking score value, $C_S$, for the food item from the determined cooking rate value and a prior cooking rate value for the food item; and
      determining the measure of doneness of the food item based on the determined $C_S$.

2. The apparatus of claim 1, wherein $C_R(T)$ includes a plurality of calibration parameters that are derived based on a calibration process that includes:
   a) determining a first internal temperature history, $T_{intern}(t)$, as a function of time, t, for a first calibration food item of the food type over a duration of time that includes a first time, $t_0$, and a determination time, $t_I$, wherein the duration of time includes a portion of time that the calibration food item was subjected to a heating source and $t_0 < t_1$;
   b) determining a first measure of experimental doneness, $D_I$, for the calibration food item at $t_1$;
   c) performing steps a)-b) for a second calibration food item of the food type to determine a second internal temperature history and a second measure of experimental doneness; and
   d) determining a value for each of the plurality of calibration parameters based on a system of calibration equations comprising $C^I_S(t_I) = B \cdot D_I$ for each calibration food item, where $$C^I_S(t_I) = \int_{t_0}^{t_I} C_R(T_{intern}(t)) dt$$

and B is a proportionality constant.

3. The apparatus of claim 1, further comprising:
   a temperature sensor that is employable to monitor the internal temperature of the food item.

4. The apparatus of claim 1, further comprising:
   a user interface that enables a selection of the food type.

5. The apparatus of claim 1, further comprising:
   a display device that is enabled to display at least one of, the determined $C_S$, or the determined measure of doneness.

6. The apparatus of claim 1, wherein the actions further include:

if the determined measure of doneness is greater than a predetermined doneness threshold, providing an alert.

7. The apparatus of claim 1, wherein $C_R(T)$ is a linear superposition of a plurality of Arrhenius terms and each of the Arrhenius terms includes an activation energy parameter and a scaling factor, wherein each activation energy parameter and each scaling factor are determined during a calibration process for $C_R(T)$.

8. A cooking apparatus for determining a measure of doneness of a food item, comprising:
  a memory device that is arranged to store a predetermined cooking rate function, $C_R(T)$, that is calibrated for a food type, wherein T is a temperature, $C_R(T)$ includes a plurality of calibration parameters, and $C_R(T)$ is calibrated with a calibration process that includes:
    a) subjecting a first calibration food item of the food type to a heating source;
    b) determining a first internal temperature history, $T_{intern}(t)$, as a function of time, t, for the calibration food item over a duration of time that includes a first time, $t_0$, and a determination time, $t_I$, wherein $t_0 < t_1$;
    c) determining a first measure of experimental doneness, $D_I$, for the calibration food item at $t_1$;
    d) performing steps a)-c) for a second calibration food item of the food type to determine a second internal temperature history and a second measure of experimental doneness; and
    e) determining a value for each of the plurality of calibration parameters based on a system of calibration equations comprising $C^I_S(t_I) = B * D_I$, for each calibration food item, where $$C^I_S(t_I) = \int_{t_0}^{t_I} C_R(T_{intern}(t))dt$$

and B is a proportionality constant; and
  a processor device that is arranged to iteratively execute instructions that enable actions, including:
    employing a temperature sensing device to monitor an internal temperature of the food item of the food type;
    determining a cooking score value, $C_S$, for the food item based on an accumulation of the calibrated $C_R(T)$ evaluated at the monitored internal temperature of the food item; and
    determining the measure of doneness of the food item based on the determined $C_S$.

9. The apparatus of claim 8, wherein $$C_R(T) = \sum_{k=1}^{n} A_k e^{-E_{ak}/RT},$$

n is a positive integer, R is a gas constant, and the plurality of calibration parameters include each $A_k$ parameter and each $E_{ak}$ parameter, for k=1 to n, inclusive.

10. The apparatus of claim 8, wherein $$C_R(T) = \sum_{i=1}^{n} w_i f_i(T),$$

n is a positive integer, and $f_i(T)$ form a set of independent functions of T, and the plurality of calibration parameters include each $w_i$, for i=1 to n, inclusive.

11. The apparatus of claim 8, wherein $C_R(T)$ comprises a tabular function of temperature T.

12. The apparatus of claim 8, wherein determining $D_I$ includes receiving an evaluation from a food evaluator.

13. The apparatus of claim 8, wherein the calibration process further includes:
  determining another measure of experimental doneness, $D_{I1}$, for the calibration food item at another determination time $t_{I1}$, wherein the duration of time includes $t_{I1}$ and $t_0 < t_{I1}$; and
  the system of calibration equations further comprises $$C^I_S(t_{I1}) = B * D_{I1}, \quad \text{where} \quad C^I_S(t_{I1}) = \int_{t_0}^{t_{I1}} C_R(T_1(t))dt.$$

14. The apparatus of claim 8, wherein the calibration process further includes:
  determining another internal temperature history for another calibration food item, $T_{intern2}(t)$, of the food type and over another duration of time that includes a second time, $t_2$, and another determination time, $t_{I2}$, wherein $t_2 < t_{I2}$;
  determining another measure of experimental doneness, $D_{I2}$, for the other calibration food at $t_{I2}$; and
  the system of calibration equations further comprises $$C^I_S(t_{I2}) = B * D_{I2}, \quad \text{where} \quad C^I_S(t_{Intern2}) = \int_{t_2}^{t_{I2}} C_R(T_{Intern2}(t))dt.$$

15. The apparatus of claim 8, wherein the calibration process further includes:
  subjecting another calibration food item to the heating source wherein the other calibration food item is a different size than a size of the calibration food item.

16. The apparatus of claim 8, wherein the calibration process further includes:
  subjecting the calibration food item to the heating source, wherein the heating source is set to a first output setting; and
  subjecting another calibration food item to the heating source, wherein the heating source is set to a second output setting.

17. A cooking apparatus for determining a measure of doneness of a food item, comprising:
  a memory device that is arranged to store a cooking rate function; and
  a processor device that is arranged to iteratively execute instructions that enable actions, including:
    determining an internal temperature history of the food item, $T_{intern}(t)$, as a function of time, t;
    determining a cooking rate value history, $C_R(t)$, for the food item based on $T_{intern}(t)$ and the stored cooking rate function, wherein the cooking rate function has been calibrated for a food type corresponding to the food item by determining an experimental doneness for a calibration food item of the food type;
    determining a cooking score value history, $C_S(t)$, for the food item, wherein $$C_S(t) = \int_0^t C_R(T_{Intern}(t))dt;$$

and
  determining the measure of doneness of the food item based on $C_S(t)$.

* * * * *